(12) United States Patent
Vallet et al.

(10) Patent No.: US 7,136,443 B2
(45) Date of Patent: Nov. 14, 2006

(54) SAMPLE SELECTION AND DATA ALIGNMENT CIRCUIT

(75) Inventors: Vincent Vallet, Mennecy (FR); Philippe Hauviller, Itteville (FR)

(73) Assignee: International Business Machines Corporation, Armonk, NY (US)

( * ) Notice: Subject to any disclaimer, the term of this patent is extended or adjusted under 35 U.S.C. 154(b) by 792 days.

(21) Appl. No.: 10/280,287

(22) Filed: Oct. 24, 2002

(65) Prior Publication Data
US 2003/0095619 A1 May 22, 2003

(30) Foreign Application Priority Data

Oct. 26, 2001 (FR) .................................. 01480100
Oct. 26, 2001 (FR) .................................. 01480101
Oct. 26, 2001 (FR) .................................. 01480104

(51) Int. Cl.
*H04L 7/00* (2006.01)

(52) U.S. Cl. ...................... 375/371; 375/354; 375/326; 375/355; 375/362; 370/516; 370/518; 713/400; 713/503

(58) Field of Classification Search ................ 375/371, 375/354, 326, 362, 355, 226; 370/516, 518; 713/400, 503
See application file for complete search history.

(56) References Cited

U.S. PATENT DOCUMENTS

| | | | |
|---|---|---|---|
| 5,487,095 A | 1/1996 | Jordan et al. | 376/371 |
| 5,550,860 A | 8/1996 | Georgiou et al. | 375/220 |
| 6,026,134 A | 2/2000 | Duffy et al. | 375/376 |
| 6,556,583 B1 * | 4/2003 | Hayashi et al. | 370/463 |
| 2003/0021368 A1 * | 1/2003 | Yoshizaki | 375/354 |

OTHER PUBLICATIONS

Vallet et al., IBM, filed concurrently herewith, entitled "Method and Circuit for Recovering a Data signal from a Stream of Binary Data".
Vallet et al., IBM, filed concurrently herewith, entitled "Transition Detection, Validation and Memorization Circuit".

* cited by examiner

*Primary Examiner*—Mohammed Ghayour
*Assistant Examiner*—Leila Malek
(74) *Attorney, Agent, or Firm*—Rosa Suazo

(57) ABSTRACT

There is disclosed a sample selection and data alignment circuit that is able to recover (retime) a data on a predefined phase of a multiphase clock signal. A plurality of over sampled signals ($G_0, \ldots, G_{n-1}$) is obtained by over sampling an incoming serial binary data (bits) stream with the n phases ($G_0, \ldots, G_{n-1}$) of a multiphase clock signal. A reliable over sampled signal is selected according to a selected signal ($G_0, \ldots, G_{n-1}$) generated by an edge detector which designates which over sampled signal is the best for subsequent processing.

3 Claims, 10 Drawing Sheets

Table 1

| G | $G_7$ $G_8$ $G_9$ $G_{10}$ $G_{11}$ | $G_0$ $G_1$ $G_2$ $G_3$ $G_4$ $G_5$ $G_6$ $G_7$ $G_8$ $G_9$ $G_{10}$ $G_{11}$ | $G_0$ $G_1$ $G_2$ $G_3$ $G_4$ |
|---|---|---|---|
| L | 0 0 0 0 0 | 0 0 0 0 0 X X 1 1 1 1 1 | 1 1 1 1 1 |
| S | $S_7$ $S_8$ $S_9$ $S_{10}$ $S_{11}$ | $S_0$ $S_1$ $S_2$ $S_3$ $S_4$ $S_5$ $S_6$ $S_7$ $S_8$ $S_9$ $S_{10}$ $S_{11}$ | $S_0$ $S_1$ $S_2$ $S_3$ $S_4$ |
| | T − 1 | T | T + 1 |

X = don't care

FIG. 12

US 7,136,443 B2

SAMPLE SELECTION AND DATA ALIGNMENT CIRCUIT

CROSS REFERENCE TO RELATED APPLICATIONS

Cross reference is hereby made to U.S. patent applications Ser. No. 10/280,285, entitled "Method and circuit for recovering a data signal from a stream of binary data" and Ser. No. 10/280,286, entitled "Transition detection, validation and memorization circuit" which were filed on even date herewith.

FIELD OF THE INVENTION

The present invention relates to high speed data communications and more particularly to a sample selection and data alignment circuit for selecting the sampled signal in a set of over sampled signals as being the best to represent the recovered data and then aligning it with a predefined phase of a locally generated multiphase clock signal.

BACKGROUND OF THE INVENTION

In high speed data communications between integrated circuits (systems), it often occurs that the signals transmitted from one integrated circuit to another one cannot be reliably sampled on a predetermined clock signal. In this case, it is common to over sample the data signal by using the different phases of a reference clock signal generated by a multiphase clock oscillator. Then, a data recovery circuit is used to determine which of the sampled signals is the best one and must be kept to represent the recovered data for subsequent processing. Such a sampling technique is extensively used in case of high speed asynchronous serial binary data communications where the clock signal is not transmitted to the receiving device. It can also be used in case of multiple data signals transmitted in parallel when the difference in data paths results in a difference in arrival times at the receiving device. Unfortunately, over sampled data signals come out as multiple signals, each one being related to a particular phase of the multiple phase clock signal. In order to reliably transmit the recovered data signal for further processing, it is necessary to realign the selected sampled signal relative to a predefined phase of the multiphase clock signal. This major problem has received a number of solutions so far, such as described in the prior art following references.

For instance, U.S. Pat. No. 6,026,134 covers some data recovery issues using an over sampling technique but does not teach how the over sampled data signal may be realigned on a predefined phase of the multiphase clock signal.

U.S. Pat. Nos. 5,487,095 and 5,550,860 describe circuits consisting of an array of resistors or delay elements to detect data edges and select the sample to recover. However, delay elements and resistors are known to be highly dependent on manufacturing process variations. In addition, there is a significant signal jitter induced by power supply variations. As a consequence, these circuits are therefore inadequate for high speed serial binary data communication applications. Moreover, the section that selects the best sampled signal for each bit of the incoming data implies a combinatory logic to demultiplex the selected sampled signal which may cause additional delay or data skew problems in such high speed applications due to the existence of different paths. Finally, these circuits are relatively complex, consuming thereby much silicon area and are not adequate for LSSD (Level Sensitive Scan Design) which allows excellent testability.

SUMMARY OF THE INVENTION

It is therefore a primary object of the present invention to provide a sample selection and data alignment circuit for selecting the sampled signal in a set of over sampled signals as being the best to represent the recovered data and then aligning it with a predefined phase of a locally generated multiphase clock signal.

It is another object of the present invention to provide a sample selection and data alignment circuit that is not sensitive to manufacturing process and supply power variations because it does not require the use of resistors or delay lines as in standard circuits.

It is another object of the present invention to provide a sample selection and data alignment that consumes minimal surface area when implemented in a silicon chip and can be designed according to the LSSD rules for high testability.

According to the present invention there is described a sample selection and data alignment circuit for recovering a data from an incoming serial binary data (bits) stream and aligning it on a predefined phase of a locally generated multiphase clock signal. The incoming serial data stream is over sampled in an over sampling circuit by the n phases of a multiphase clock signal. The frequency of the clock is usually the same or half of the frequency of the incoming data. The over sampled signals (S) are applied to an edge detector or the like, that generates a control signal (G) that is used to drive the sample selection and data alignment (SSDA) circuit of the present invention, so that the over sampled signal that is selected is the best for subsequent processing, e.g. approximately at the middle of the bit duration, i.e. the farthest from the bit edges. The SSDA circuit is designed to synchronously capture the selected sampled signal with the phase of the clock signal that was used for sampling, to shift the selected sampled signal to the next adjacent clock phase and to repeat this process as many times as needed, so that the data that is output therefrom (recovered data-out) is synchronous to a predefined clock phase. To that end, the SSDA circuit basically consists of a column of level sensitive latches and a corresponding column of multiplexers connected in a daisy chain fashion.

The SSDA of the present invention is able to recover (retime) a selected data on a predefined clock phase signal without introducing additional data perturbations. The SSDA circuit works synchronously with the multiple phase clock signal and its performance does not depend on the manufacturing process because it does not require any resistor or delay line as in standard similar circuits.

The novel features believed to be characteristic of this invention are set forth in the appended claims. The invention itself, however, as well as other objects and advantages thereof, may be best understood by reference to the following detailed description of an illustrated preferred embodiment to be read in conjunction with the accompanying drawings.

BRIEF DESCRIPTION OF THE DRAWINGS

FIG. 12 shows a Table indicating which sampled signal (S) is selected versus the combination of the select signals (G) and the underflow/overflow bit (L) generated by the overflow/underflow detection circuit of FIG. 10 (when it is adapted to process one bit per clock period).

DESCRIPTION OF A PREFERRED EMBODIMENT

In conventional DR and CDR circuits, two different phases of a reference clock signal delayed in time are used, one to detect a transition and the other to capture the data for subsequent processing. However, it should be recognized that because of possible metastability problems, the particular sampled signal (or sample) obtained by performing the sampling at a data transition (logic state 1 to 0 or vice-versa) is not reliable to accurately locate the exact position of the transition and the detection is even more complicated by the presence of glitches and false detections. As a result, the conventional techniques of sampling that have been practiced so far appear to be close to limit as the clock frequencies continue to sharply increase.

Figure 2:
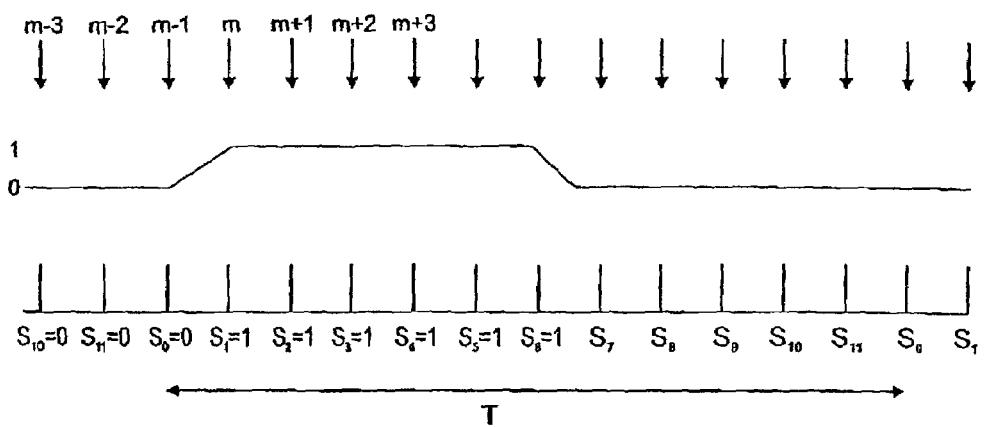
FIG. 2 is a diagram to illustrate the basic principles of the over sampling technique according to the present invention that uses the n=12 phases, labeled $C_0$ to $C_{11}$, that are obtained with the oscillator of FIG. 4.
Figure 2:
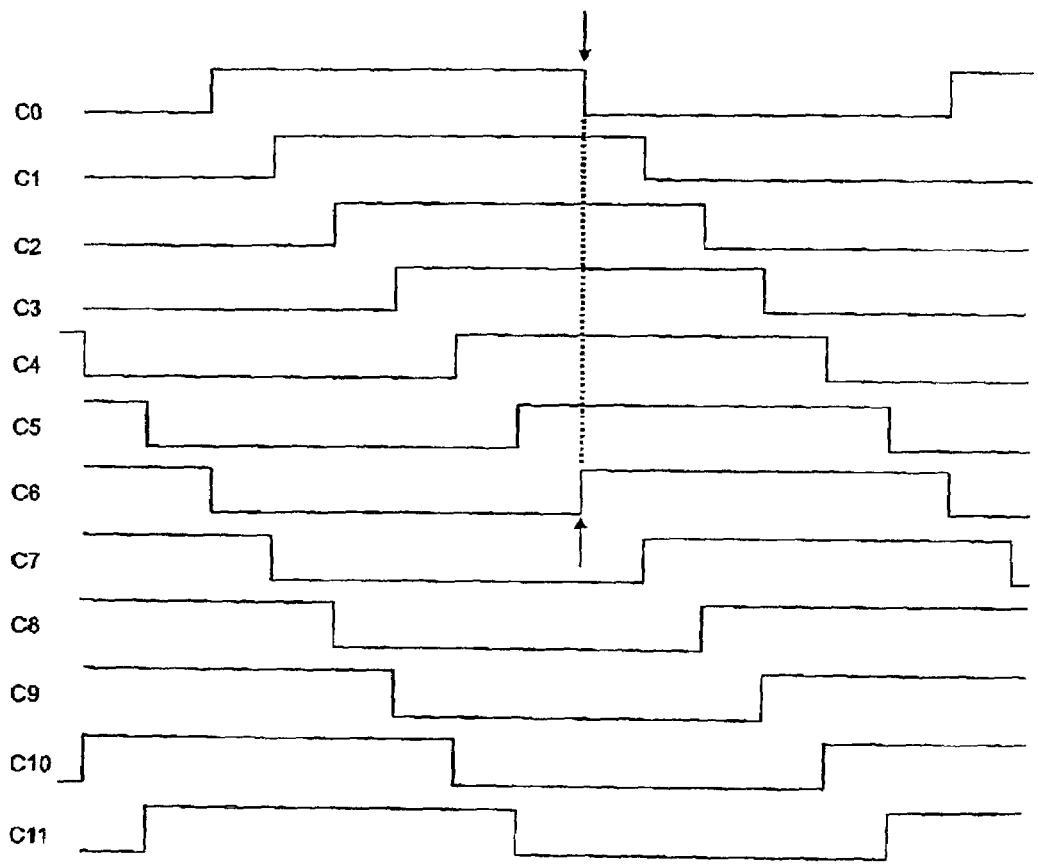

FIG. 2 is an example of a typical data bit stream, assuming that the clock frequency is the half of the incoming data frequency (the frequency of the multiphase clock is usually the same or half of the frequency of the incoming data signal). As apparent in the upper part of FIG. 2, the data goes from 0 to 1 (first transition) and then back from 1 to 0 (second transition), so that a first bit equal to 1 is followed by a second bit equal to 0. The arrows are related to the relative positions of the leading edges of the clock signals shown in the lower part of FIG. 2. In this case, there are n=12 clock signals, labeled $C_0$ to $C_{11}$, generated by the multiphase clock generator that determine the times/positions where the data-in stream is sampled. Because, still in the instant case, the clock oscillates at half the frequency of the incoming data, clock signals $C_0$ and $C_6$ are delayed by a half-period and are in total phase opposition. Twelve sampled signals $S_0$–$S_{11}$ are thus obtained for each period T of the clock signal wherein $S_0$–$S_5$ represent the sampled signals for the first bit and $S_6$–$S_{11}$ represent the sampled signals for the second bit of the data stream. Note that, if there is no change in the transmitted data, e.g. a series of "1" is sent, in this case there is no longer a transition between two consecutive bits and the boundary therebetween is rather defined by the wording "edge of a datum".

The over sampling and the specific signal processing mentioned above that will be now described in detail significantly departs from said conventional techniques. According to the present invention, the specific signal processing used to locate the transition position in the data stream is based on three comparisons performed at each sampling on a specific set of sampled signals. Still referring to FIG. 2, for instance, at position (m+2) or later on, three comparisons are performed on the sampled signals obtained at positions (m−2), (m−1), (m+1) and (m+2), i.e. $S_{m-2}$, $S_{m-1}$, $S_{m+1}$ and $S_{m+2}$, to check whether or not the following rules written in a mathematical form are met:

$$S_{m-2}=S_{m-1} \quad (1)$$

$$S_{m-1} \neq S_{m+1} \quad (2)$$

$$S_{m+1}=S_{m+2} \quad (3)$$

Let us assume that when these relations (1)–(3) are verified, this means that a transition has occurred at position (m). A transition that occurred at position (m) will be thus identified at the time of position (m+2) or later on. Therefore, two operations based on three comparisons involving six over sampled signals (the central one being excluded at each time) are thus necessary to detect a transition. As a result, the above method is based upon an "a posteriori" decision.

It is to be noted that according to the present invention, any transition will be detected twice, since two over sampled signals will meet rules (1)–(3). As apparent in FIG. 4, position (m−1) matches the above transition detection conditions as does position (m). This means that the transition is either centered on the position of over sampled signals $S_{m-1}$ or $S_m$, therebetween. Still according to the method of the present invention, only the second transition detection will be considered because it offers an extra delay to the following circuitry.

Therefore, according to the present invention, for a reliable process to avoid errors that could be caused by such a double transition detection, when a transition is detected at position (m), if it was previously detected at position (m−1), this position (m−1) will be invalidated and the transition is said to be located at position (m). Note that, still according to the present invention, sampled signal $S_m$ will not be used because it is not considered reliable enough. In this particular instance where there are six samplings per bit, the sampled signal at position (m+3) is preferred as being approximately at the centre of the bit duration and it offers the maximum tolerance to the jitter. In the following description, the sampled signal at position (m+3), i.e. $S_{m+3}$, will be used as reliably representing the bit value (although sampled signals at positions (m+1) and (m+2) would also be adequate too. More generally, if a transition is detected at position (m), the sampled signal to be kept is the signal at position (m+p), wherein p is the number n of samples divided by twice the number b of bits in one period of the multiphase clock signal (p=n/2×b). In the example shown in FIG. 2, the sequence of sampled signals is $S_{10}$=0, $S_{11}$=0, $S_0$=0, $S_1$=1, $S_2$=1, $S_3$=1, $S_4$=1, . . . , and so on. The transition is detected on the leading edges of clock signals $C_0$ and $C_1$, sampled signal $S_1$ is considered representing the transition, so that the sampled signal that will be subsequently used is $S_4$ obtained on the leading edge of clock signal $C_4$. As still apparent in FIG. 2, this method is interesting in that it compares sampled signals that are very close one from another, but the time open to perform this comparison is large when compared to the time interval between them.

The Multichannel Receiver 21

Figure 3:
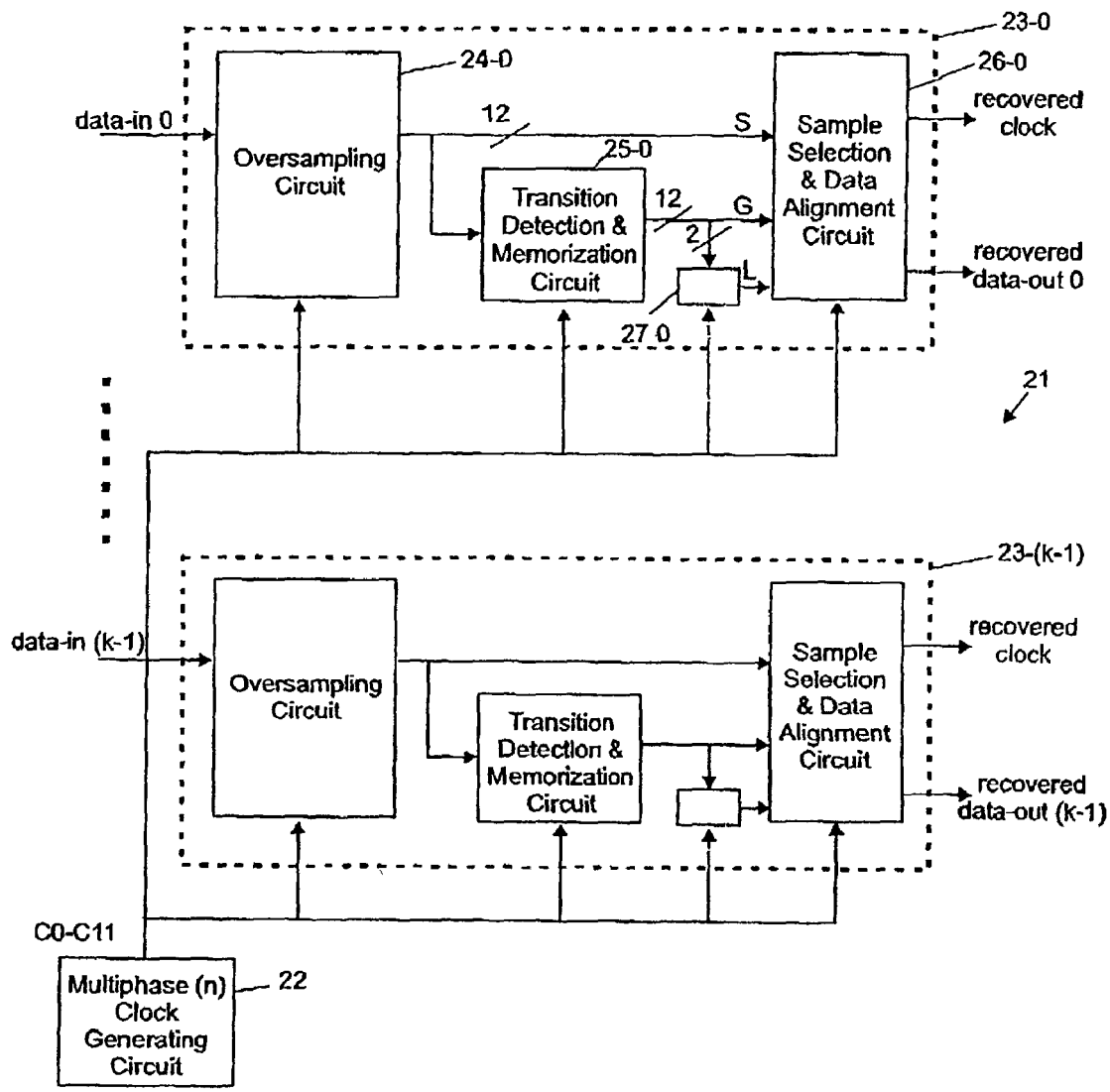
FIG. 3 schematically shows the architecture of a multi-channel receiver comprised of a plurality of data recovery circuits, each one including the sample selection and data alignment circuit (SSDA) of the present invention and a local multiphase clock generator.

FIG. 3 shows the architecture of the multichannel receiver referenced 21 that performs the data recovery on a plurality of incoming data streams for high speed serial data communications according to the present invention. Now turning to FIG. 3, the receiver 21 first comprises a multiphase clock generation circuit 22 and k data recovery circuits, labeled 23-0 to 23-(k−1), one for each data stream: data-in 0 to data-in (k−1).

Each DR circuit 23 comprises an over sampling (OS) circuit 24, a transition detection/validation/memorization (TDVM) circuit 25 and a sample selection and data alignment (SSDA) circuit 26. Optionally, an overflow/underflow detection (OD) circuit 27 can be used to improve SSDA operation and thereby the DR circuit overall performance. The multiple phase clock signals generated by the clock generation circuit 22 are applied to all circuits 24–27 of DR circuit 23. If we consider DR circuit 23-0 which processes the data-in 0 stream, the sampled signals S output from OS circuit 24-0 are applied to the TDVM circuit 25-0 and to a first input of the SSDA circuit 26-0 which also receives the signals, referenced G, generated by the TDVM circuit 25-0 on a second input. In turn, SSDA circuit 26-0 generates two signals: the recovered clock and the recovered data, in this case data-out 0. The recovered clock is a predefined phase of the multiphase clock signal and the recovered data is perfectly aligned therewith, allowing thereby an excellent subsequent processing of the recovered data. OD circuit 27-0 is connected to the output of TDVM circuit 25-0 (it is driven by 2 signals G corresponding to the centre of a bit duration) and to a third input of SSDA circuit 26-0. The role of OD circuit 27 is to extend the selection capability of the SSDA circuit and to improve the jitter immunity of DR circuit 23 in terms of jitter, i.e. to tolerate more jitter in the incoming data stream.

Let us consider data recovery circuit 23-0 for the sake of illustration. The serial data stream, data-in 0, is over sampled in OS circuit 24-0 by means of the twelve clock signals $C_0$ to $C_{11}$ generated by clock generation circuit 22 at each period of the multiphase clock signal. The frequency of the multiphase clock signal is usually the same or half of the frequency of the incoming data for stability reasons. The sampled signals S are fed in the TDVM circuit 25-0 and in the SSDA circuit 26-0. Innovative TDVM circuit 25-0 is comprised of three sections. The first section is built around a transition detection circuit that has been specifically designed to be relatively insensitive to noise, i.e. to ignore sampling errors caused by glitches. The second section aims to make the first transition detection inoperative when it is immediately followed by the second detection of the same transition. The role of the third section is to memorize the position of the second detection as being the transition position. In essence, the TDVM circuit 25-0 determines the position of a transition in the incoming data stream, it eliminates errors that could be due to glitches and finally, it memorizes the transition position. Signals output by TDVM circuit 25-0 are used to drive the innovative SSDA circuit 26-0 to select a valid, reliable sampled signal. The SSDA circuit 26-0 is further able to synchronize the selected sampled signal relatively to a predefined phase of the multiphase clock signals. In the above example described by reference to FIG. 2, where there are 6 clock signals for each bit of the incoming data, it is considered that if a transition has been detected at position (m), sampled signal $S_{m+3}$ at position (m+3) is the most reliable in all respects, because it is substantially at the centre of the bit duration at a position which is the farthest from the two extreme edges in the case the bit signal rises from 0 to 1 and then goes back from 1 to 0. Note that, if there is no subsequent detection of a transition in the incoming data stream (e.g. a series of "1"), this transition that has been memorized will be used to determine the sampled signal at the centre of each bit.

Let us now describe the different circuits composing the multichannel receiver 21, i.e. the clock generation circuit 22 and one data recovery circuit, generically referenced 23, in more detail.

The Clock Generation Circuit (CG) 22

Figure 1:
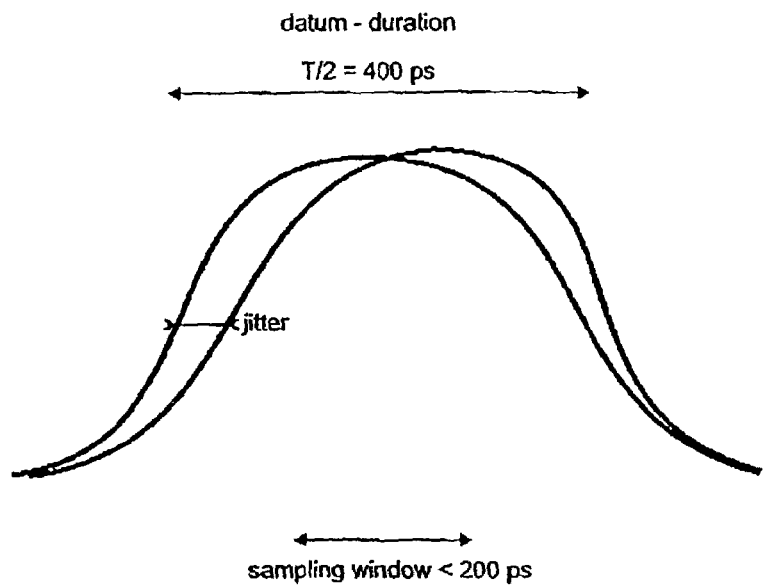
FIG. 1 shows the diagram of a bit in a typical 2.5 Gbit/s serial data stream when the transmission is affected by jitter.
Figure 4:
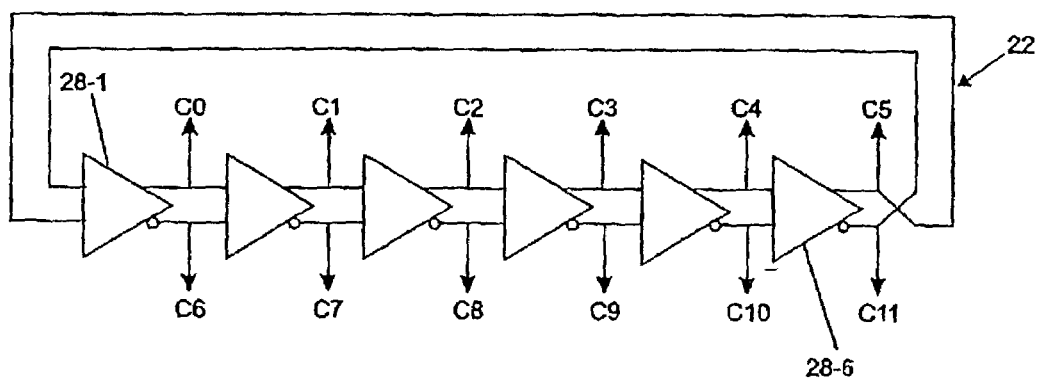
FIG. 4 shows a conventional 6-stage oscillator which generates the multiphase clock signals that are necessary for a proper operation of the receiver.

FIG. 4 shows a preferred implementation of a multiphase clock generation (CG) circuit 22 based upon a ring oscillator, although multiple phase clock signals can be generated using a number of conventional oscillating circuits as known for those skilled in the art. FIG. 4 shows a typical 6-stage ring oscillator that is well adapted to generate the twelve phases that are required in the description of the preferred embodiment of the present invention. As apparent in FIG. 4, the ring oscillator comprises 6 elementary differential buffers 28-1 to 28-6 that are serially connected for high stability. The multiple phase clock signals that are obtained are those referenced $C_0$ to $C_{11}$ in FIG. 2. They are either derived from a master reference clock signal having a frequency of N MHz (N=1/T) or extracted from the incoming data via a phase detector (PD) circuit. Note that the delays of buffers 28-1 to 28-6 are controlled by a common PFD/filter circuit forming a clock recovery unit which ensures that the frequency of the multiphase clock signals generated by CG circuit 22 is substantially the same or half the frequency of the data stream. As a result, in the case of multiple channels (i.e. communication links) it is possible to extract the clock from a single channel/link and use the recovered clock frequency for recovering the data on each of the other channels by performing a phase adjustment.

The Data Recovery (DR) Circuit 23

It is comprised of a few circuits that will be now described in detail.

The Over Sampling (OS) Circuit 24

Figure 5:
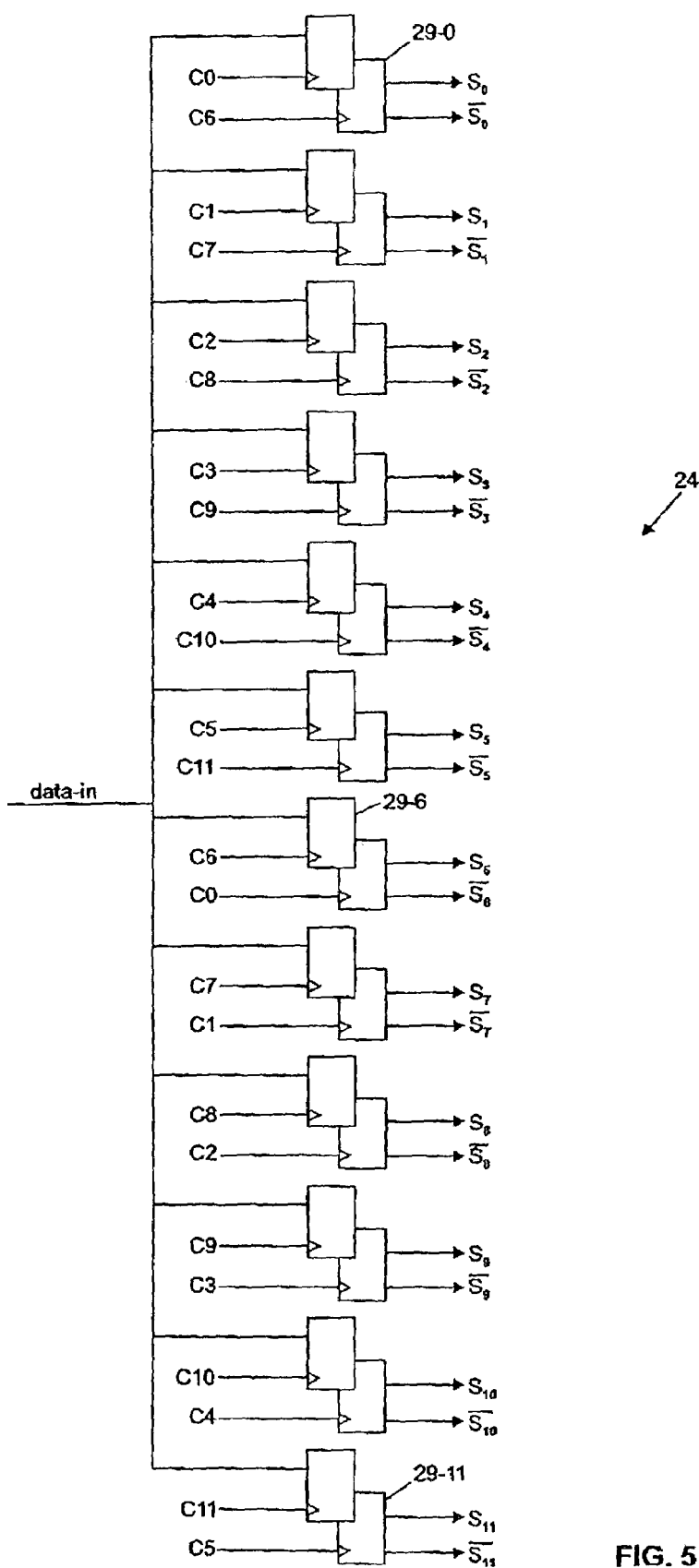
FIG. 5 shows the LSSD-based over sampling circuit which is used in the data recovery circuit of the present invention.

The OS circuit 24 (e.g. 24-0 for data-in 0 stream) which is shown in FIG. 5 has a particular construction to ensure a high stability to the sampled data signals at its outputs for a whole clock period. Because of the half-rate clock mentioned above, the over sampling circuit 24 collects two consecutive bits of serial data in 12 samples. The sampling of any data stream e.g. data-in 0, is done through edge sensitive flip-flops or preferably master-slave latches 29-0 to 29-11 as illustrated in FIG. 5. Master-slave latches are preferred because they allow a level sensitive scan design (LSSD) implementation for better testability. For instance, let us consider latch 29-6. The master latch data input is connected to the data-in common line while its clock input receives the $C_6$ clock signal. When the master clock signal returns to the low state (logic 0), the data in the data-in stream is captured and is maintained for a whole clock period, irrespective of the variations, that may occur thereon. In that respect, clock signal $C_6$ ensures that a very stable sampled signal $S_6$ is output, because the clock signal $C_0$ which is applied on the clock input of the slave latch is in phase opposition with clock signal $C_6$, as mentioned above.

The Transition Detection/Validation/Memorization (TDVM) Circuit 25

In essence, TDVM circuit 25 is comprised of three sections or stages, each performing a different function: detection, validation and memorization.

Figure 6A:
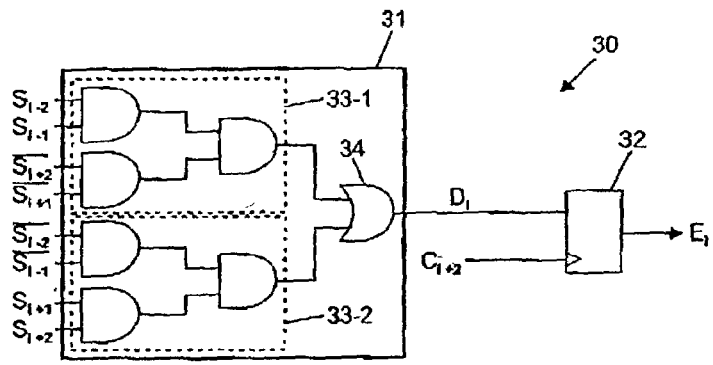
FIGS. 6a to 6c show the elementary circuits composing the transition detection/validation/memorization (TDVM) circuit which is an essential element of the data recovery circuit to generate the select signals.

The circuit forming the first section is shown in FIG. 6a where it bears numeral 30. The role of circuit 30 is to detect any transition in the incoming data stream. For instance, assuming circuit 30 belongs to TDVM circuit 25-0, 12 identical circuits 30 are necessary to detect a transition in the data-in 0 stream. FIG. 6a shows only one circuit 30 using a current indicia i (i varies from 0 to 11) configured to detect a transition that would occur at position (i) corresponding to sampled signal $S_i$. It just suffices to vary indicia i from 0 to 11 to substantially derive the full set of circuits 30 as it will be shown later on by reference to FIG. 7. A transition at a given position is identified by examining at each sampling, whether the two previous sampled signals and the two next sampled signals meet the relations (1)–(3) given above or not. If $S_{i-2}=S_{i-1}$, $S_{i-1} \neq S_{i+1}$ and $S_{i+1}=S_{i+2}$, a transition is identified as being located at position (i). Note that, according to that present method, a transition will be systematically detected by two consecutive circuits 30. The particular construction of circuit 30 offers a major advantage, because it is insensitive to glitches which are often identified as a transition in standard edge detection circuits. A glitch, i.e. a very short parasitic pulse, can by no means meet the above relations (1)–(3).

Still considering FIG. 6a, circuit 30 is comprised of logic circuit 31 and level sensitive latch 32. Logic circuit 31 is comprised of two blocks 33-1 and 33-2 of three AND gates driving a two-way OR gate 34. Sampled signals that are applied to blocks 33-1 and 33-2 as inputs are specified in FIG. 6a. Logic circuit 31 generates an output signal $D_i$ which is at a high logic level (e.g. a "1") if the three above relations are verified for a particular value of current indicia i. The output of logic circuit 31 is connected to the data input of level sensitive latch 32 while clock signal $C_{i+2}$ is applied on its clock input (clock signal $C_{i+2}$ is used because it corresponds to sampled signal $S_{i+2}$ which is the latest of the signals applied to logic circuit 31). The signal which is output from level sensitive latch 32 is labeled $E_i$. The first section thus allows identification of a transition, without taking into account the sampled signal $S_i$ corresponding to this transition. Because of possible metastability problems, this particular sampled signal $S_i$ is not reliable.

Figure 6B:

Due to the particular construction of circuit 30, any transition will be detected twice, but only the second detection will be considered to represent the transition. To that end, the second section of TDVM circuit 25 is thus built to only retain the last one of two (or more) consecutive detections to avoid any conflict therebetween. Therefore, the role of this section is to validate the position of the last detection of a same transition. Now turning to FIG. 6b, this second section is implemented by circuit 35. The signal $E_i$ that is output from circuit 30 is applied to a first input of AND gate 36. Signal $E_{i+1}$ is complemented in inverter 37-1 then applied to a second input of AND gate 36. Optionally, signal $E_{i+3}$ could also be applied on a third input of AND gate 36 via inverter 37-2 to improve glitch elimination. The signal that is output from AND gate 36 is applied to the data input of level sensitive latch 38 while its clock input is driven by clock signal $C_{i+8}$ ($C_{i+8}$ is selected because it is in phase opposition with $C_{i+2}$ to improve stability). The signal supplied by level sensitive latch 38 is labeled $F_i$. Latched signal $F_i$ thus represents a validated transition detection and remains valid during a full clock period. Note that level sensitive latches 32 (FIG. 6a) and 38 (FIG. 8b) can be combined in a single master/slave latch pair for improved testability and design simplicity, their clock signals being in phase opposition, i.e. separated by a half clock period. For instance, assuming the multiphase clock signal generated by CG circuit 22 has a frequency equal to 1.25 Ghz and having 12 phases, a transition can be identified at every 70 ps (800 ps/12) interval. Signal $F_i$ at the output of circuit 35 would remain available the full clock period, i.e. 800 ps which gives a lot of time to the following circuits for its processing. Another advantage, is that, by construction, if two signals E, e.g. $E_{i-1}$ and $E_i$ arrive in sequence, not only $E_i$ is kept but it is used to reset signal $E_{i-1}$ and it will be captured later on with clock $C_{i+8}$. As a result, only the $E_i$ signal representing the position of the second or the last detection (in case of multiple detection) is validated and stored at a high level in level sensitive latch 38 as signal $F_i$. This detection will be referred to hereinbelow as "the detected transition".

Figure 6C:
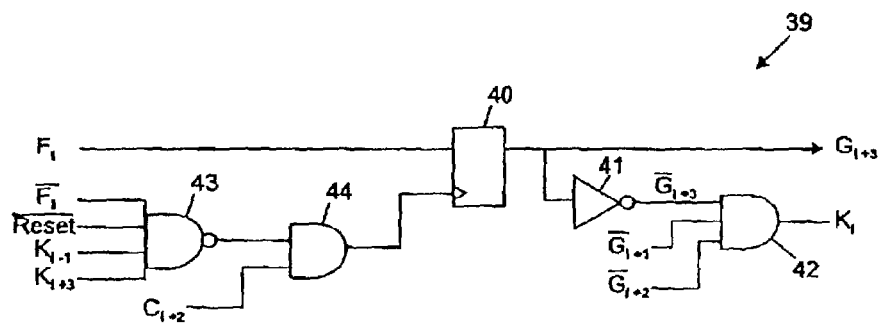

The third section of the TDVM circuit 25 memorizes the position of the detected transition in a memory element. Any detected transition sets the memory element to a high logic state ("1"). Any other detected transition within plus or minus 3 sampled signals resets the memory element. The signal available at the output of the memory element, is referred to hereinbelow as the "select" signal labeled G, because it will be used to select the best sampled signal S in the set. An important particularity of the memory element is that a select signal (e.g. $G_{i+3}$) can only be reset after another select signal (e.g. $G_j$) is set. It is expected that a new selected sampled signal would always appear in a position close to the previous one, so that two consecutive sampled signals selected during a short amount of time would not be a problem because they are far from the transition and would thus have the same value. A typical hardware implementation of the third section is represented in FIG. 6c by circuit 39 (it should be clear that there are as many circuits 35 and 39 as there are circuits 30). Signal $F_i$ supplied by circuit 35 is applied to a latch 40 which plays the role of the memory element mentioned above. The select signal that is output therefrom, is labeled $G_{i+3}$, i.e. the signal that selects the right sampled signal S, in the instant case $S_{i+3}$ in accordance with the above mentioned principle. Signals $-G_{i+3}$ (obtained by complementing signal $G_{i+3}$ in inverter 41), $-G_{i+1}$, and $-G_{i+2}$ are applied to AND gate 42 to generate signal $K_i$. $K_i$ is thus the signal that is internally used to reset the three preceding and the three following corresponding latches 40 in TDVM circuit 25. Signal $-F_i$, $K_{i-1}$, and $K_{i+3}$ are applied to a NAND gate 43. The signal that is output from NAND gate 43 and clock signal $C_{i+2}$ are applied to AND gate 44 to drive the clock input of latch 40. As a result of the particular construction of circuit 39, it is impossible to have all the select signals G at the low level at the same time. Let us consider the case of one bit per clock period and assume that $G_i$ is high. If now signal $G_{i+1}$ becomes high, it will force $G_i$ to go to the low state, so that after a clock period, there will be only one signal, i.e. $G_{i+1}$, at the high state. By contrast, if we have two bits per clock period, there will be two select signals active at the same time, one for each bit, the second one being unable to reset the first one as a result of the $K_i$ signal construction.

Figure 7:
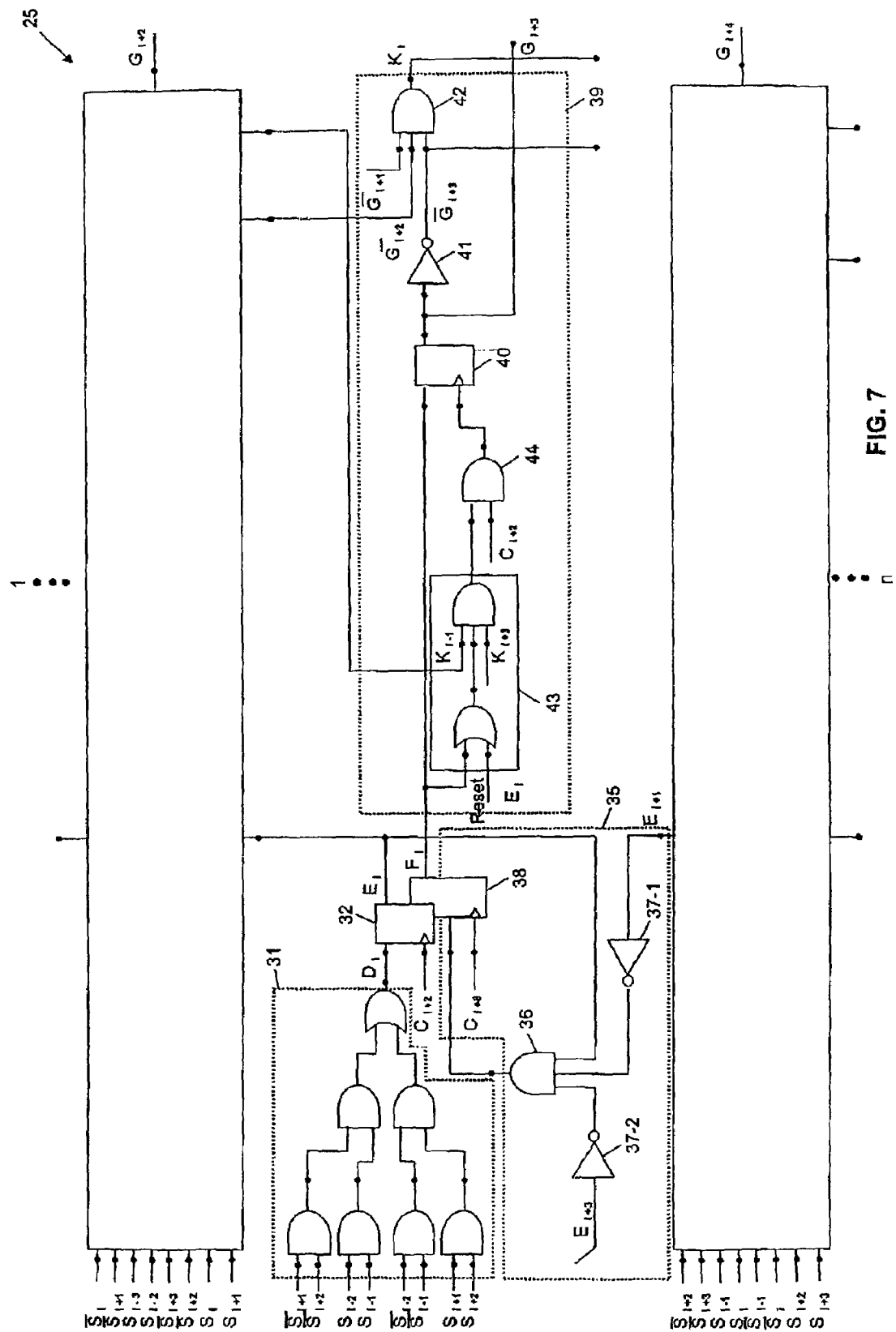
FIG. 7 shows an overall view of the transition detection/validation/memorization circuit grouping the elementary circuits described by reference to FIGS. 6a to 6c.

FIG. 7 shows a more realistic view of the TDVM circuit 25 interconnecting scheme which is comprised of 12 identical circuit slices, each slice basically corresponds to the integration of elementary circuits 30, 35 and 39 (some logic functions have been merged to avoid unnecessary duplication of circuits). Each slice thus corresponds to the detection/validation/memorization of the transition position performed at a determined sampling. The memorized signal is the select signal adequate to select the best sampled signal. Note that the last slice is connected to the first one. TDVM circuit 25 has as many select lines G as there are sample signals S, each select line corresponding to a sampled signal. A select line at the low level indicates that the corresponding sample must be dismissed while a select line at the high level means that the sample must be kept. In summary, in the preferred embodiment where we have two bits in twelve samples, the TDVM circuit 25 provides 12 select signals G, among them two select signals, e.g. $G_i$ and $G_{i+6}$, are high to indicate the rank of the sampled signals, in this case $S_i$ and $S_{i+6}$, to be kept as being the best of the sampled signals for each bit. These select lines are not expected to switch at the input data rate. In ideal conditions, after having been set, the select lines may not switch at all. In very noisy conditions, the switching activity on select lines is still supposed to occur at a frequency well below the incoming data rate.

The Sample Selection/Data Alignment (SSDA) Circuit 26

Figure 8:
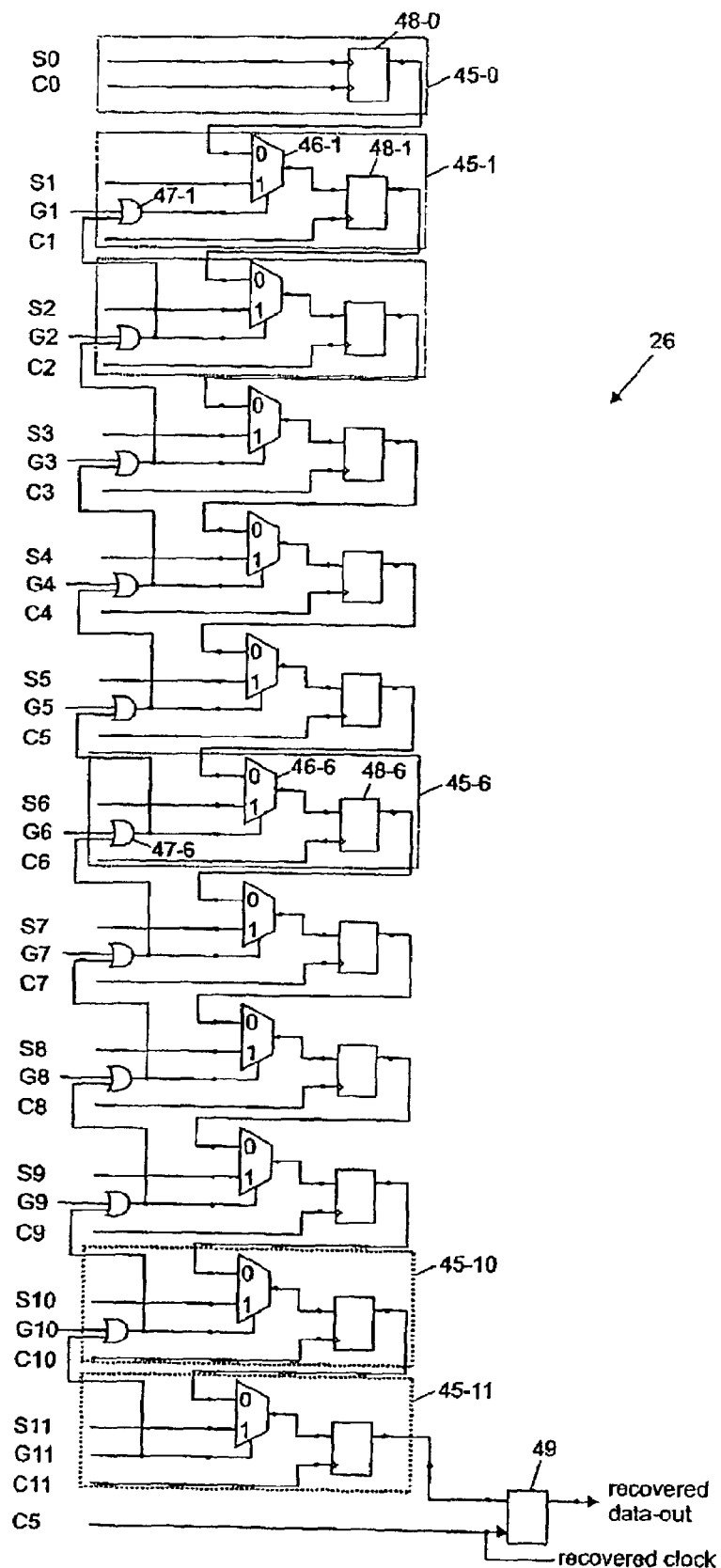
FIG. 8 shows the sample selection and data alignment circuit (SSDA) of the present invention when adapted to process one bit per clock period.

As described above by reference to FIG. 7, the index of select signal $G_i$ corresponds to a sampled signal $S_i$. Select signal $G_{i+3}$ will select sampled signal $S_{i+3}$ (if two bits per period) or $S_{i+6}$ (one bit per period) and more generally select signal $G_i$ will select sampled signal $S_{i+n/2b}$ (where n is the number of phases of the reference clock signal and b is the number of bits per period). The sample selection/data alignment (SSDA) circuit 26 of the present invention is responsible for the selection of the adequate sampled signal and its alignment on a predefined phase of the multiphase clock signal. FIG. 8 schematically shows a preferred implementation of SSDA circuit 26 when designed to process a data bit stream having a rate equal to the frequency of the CG circuit 22, i.e. one bit per clock period. Circuit 26 first consists of a series of 12 logic blocks 45 that are substantially identical, each one consisting of a two-way multiplexer 46, an OR gate 47 and a level sensitive latch 48 connected as shown in FIG. 8. Note that in the first logic block 45-0, the multiplexer 46 and OR gate 47 are not implemented because select signal $G_0$ is not wired (it is not necessary). Latch 48-0 stores sampled signal $S_0$ when the clock phase signal $C_0$ is high. Its output is connected to the first input of multiplexer 46-1, sampled signal $S_1$ being applied the other input. Multiplexer 46-1 is controlled by the select signal $G_i$ via OR gate 47. The output of multiplexer 46-1 is connected to the input data of latch 48-1 while phase signal $C_1$ is applied on its clock input. As apparent in FIG. 8, similar construction applies up to the last logic block 45-11 which processes signals $S_{11}$, $C_{11}$ and $G_{11}$ and feeds the data input of latch 49, the clock input of which receives the clock phase signal $C_5$. Note that, in the last logic block 45-11, the OR gate 47 has not been implemented. Latches 48 and 49 are of the level sensitive type. The data-out (recovered data) is available at latch 49 output and $C_5$ is referred to as the recovered clock. Each of the latches 48 (e.g. 48-1) is connected to its own clock phase (e.g. $C_1$). The latches are fed by either a sampled signal ($S_0, \ldots, S_{11}$) or by the signal that is output from the previous latch. The SSDA circuit 26 thus basically consists of a column of latches and a corresponding column of multiplexers, so that the logic blocks 45 are connected in a daisy chain fashion.

Multiplexers 46 are implemented to control which sampled signal feeds a given latch 48 and they are connected so that all sampled signals prior to the currently selected sampled signal (in a selected logic block), are captured in the corresponding latches. In all logic blocks positioned after the selected logic block that has captured the sampled signal, the select lines are all at the low level. Any sampled signal prior to the selected one is captured in a latch and any sampled signal after said selected one is ignored. As a consequence, the selected sample is synchronously flushed to the bottom of the column as it will be now described. If for instance, the selected sampled signal is $S_6$, all the select signals $G_0$ to $G_{11}$ will be at the low logic level except select signal $G_6$ (corresponding to a transition detected at position 0), i.e. only the $G_6$ line is active, i.e. at a high logic level ("1"), the latch in logic block 45-6 captures the $S_6$ sample when the corresponding $C_6$ clock signal is at the high logic level. The latch output then takes the value of the selected sample $S_6$. When the $C_7$ clock signal comes to the high logic level, the latch in the logic block 45-7 captures this $S_6$ value. The process is repeated until the selected sampled signal is transmitted to the last latch at the bottom of the latch column and then in the output latch 49. These samples prior to the selected one are not kept but having captured them allows the SSDA 26 not to lose any sampled signal if it comes to deselect sampled signal $S_i$ to select sampled signal $S_{i-1}$. Output latch 49 ensures that the sampled signal representing the datum is present on its output during a full clock period.

Figure 9:
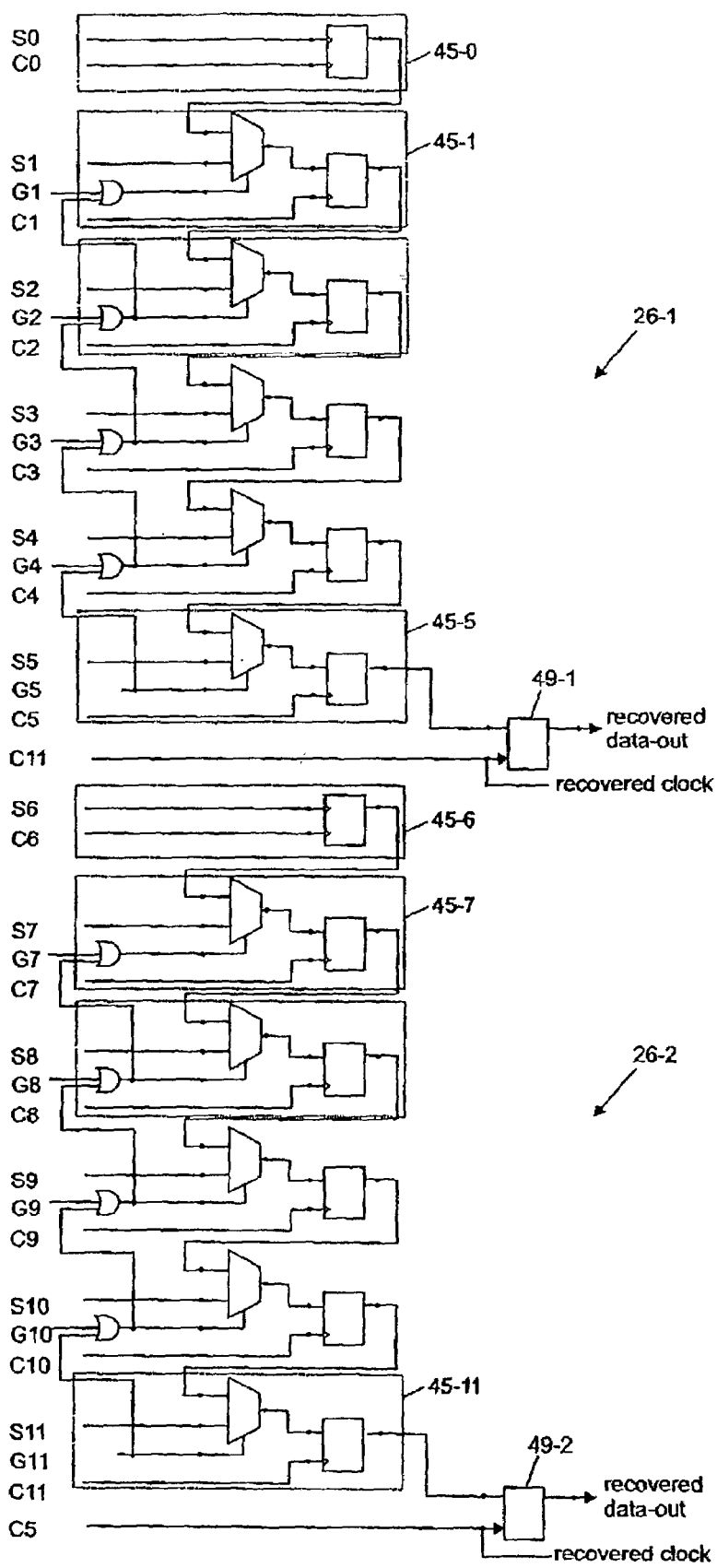
FIG. 9 shows a design variant of the sample selection and data alignment circuit of FIG. 8 when it is adapted to process two bits per clock period.

Now turning to FIG. 9, the SSDA circuit, now comprised of two elementary circuits 26-1 and 26-2, addresses the case where the frequency of the reference clock signal is half the rate of the incoming data (i.e. there are two bits in a clock period). The upper half circuit 26-1 is adapted to process the six signals $S_0$–$S_5$ corresponding to clock phase signals $C_0$–$C_5$ using select signals $G_1$ to $G_5$ related to the first bit of the incoming data. The lower half circuit 26-2 is identical in all respects to circuit 26-1. It processes the six signals $S_6$–$S_{11}$ using select signals $G_7$–$G_{11}$ for the second bit. It is to be noted that in this case, there are two data-out lines to transport the recovered data, so that the following circuitry must be adapted to take bits alternatively from these lines. Likewise, there are two clock lines to transport the recovered clocks (which are in phase opposition).

As a result, SSDA 26 circuit processes one bit with 12 samples, while SSDA circuits 26-1 and 26-2 process one bit with six samples within a clock period. A detailed examination of SSDA circuits 26, 26-1 and 26-2 shows that in spite of their apparent differences, they have a quite similar construction still based upon two base sections. Referring to the SSDA circuit 26 of FIG. 10, the first section consists of a plurality of logic blocks 45 and the second section consists of output latch 49. Each logic block 45 comprises a multiplexer 46, an OR gate 47 and a latch 48 connected as described above. Finally, a flip-flop or a master/slave latch pair, plays the role of the said output latch to ensure that the selected sampled signal will be present on the data-out line during a full clock period according to a key feature of the present invention. If a single latch is used, the clock phase signal applied on its clock input must be in phase opposition with the clock phase applied to the latch of the last logic block (e.g. 45-11 in the case of SSDA 26).

As such, the data recovery circuit 23-0 is able to support a phase difference between the data-in 0 stream and the recovered clock and/or a high frequency jitter (in a frequency range close to the data rate) with a high amplitude (plus or minus one half bit). To optimize the jitter immunity and the phase error reduction, it is required that the above mentioned clock recovery unit be designed to align (as much as possible) the clock phase $C_0$ with the transitions of the incoming data.

The Overflow/Underflow Detection (OD) Circuit 27

When the transmitter and the receiver reference clocks have some offset or the jitter greatly shifts the data, it would be highly desirable to extend the data selection range. SSDA circuit 26 of DR block 23 such as described above only supports a jitter amplitude limited to 1 bit, i.e. it is limited to process sampled signals within one period of the incoming data. Neither TDVM circuit 25 nor SSDA circuit 26 are designed to support an underflow or an overflow. In case of one bit per period, a selection moving from $S_0$ to $S_{11}$ (preceding $S_0$) is an underflow and a selection moving from $S_{11}$ to $S_0$ (following $S_{11}$) is an overflow. In case of two bits per period, a selection moving from $S_6$ to $S_5$ or moving from $S_0$ to $S_{11}$ is an underflow and a selection moving from $S_5$ to $S_6$ or moving from $S_{11}$ to $S_0$ is an overflow. It is theoretically possible to increase the jitter tolerance to 1.6 bits by detecting such overflow/underflow and selecting the corresponding sampled signal.

Figure 10:
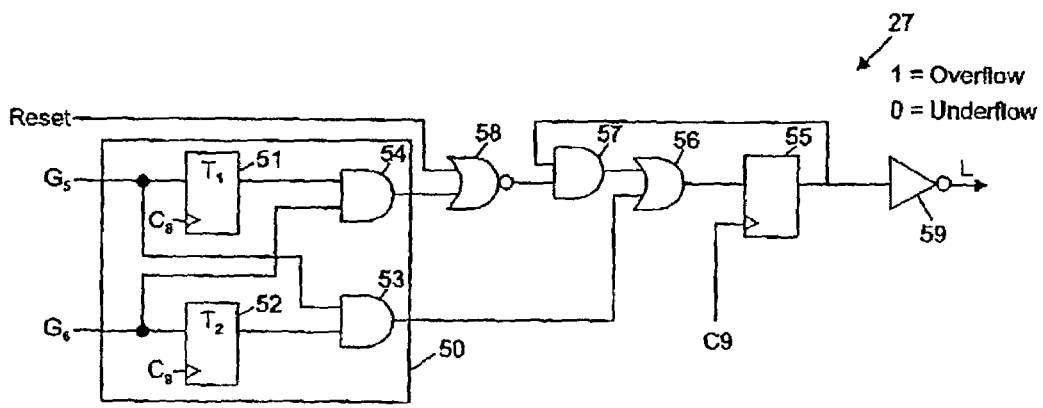
FIG. 10 shows an optional overflow/underflow detection (OD) circuit that can be used to significantly improve the operation of the sample selection and data alignment circuit and thus the overall operation of the data recovery circuit.

FIG. 10 shows a preferred implementation of overflow/underflow detection (OD) circuit 27 to process a data bit stream having a rate equal to the clock frequency. Two identical circuits would be required if we have two bits per period of the incoming data. The OD circuit 27 detects when the TDVM circuit 25 changes the index (i) of the selected G signal through a middle point. When the edge index passes below the middle point (e.g. $G_6$ to $G_5$), the overflow/underflow bit L is equal to logic 1 designating thereby an underflow. When the edge index passes over the middle point (e.g. $G_5$ to $G_6$), the overflow/underflow bit L is equal to logic 0 designating thereby an overflow. Therefore, it processes select signals $G_5$ and $G_6$ which are at the middle of the select signal range ($G_0$–$G_{11}$)

Now turning to FIG. 10, signals $G_5$ and $G_6$ are applied to a block 50 comprised of a pair of latches 51 and 52 and of a pair of two-way AND gates 53 and 54 that are cross-coupled. Clock signals $C_8$ and $C_9$ are applied on the clock input of latches 51 and 52 respectively (any stabilized clock signal appearing after select signals $G_5$ and $G_6$ would be adequate). A latch 55, the clock input is driven by clock phase $C_9$, is provided to memorize the overflow/underflow bit L. The data input of latch 55 is driven by the output of OR gate 56. One input of OR gate 56 is connected to the output of AND gate 53 and the other input is connected to the output of AND gate 57. The output of latch 55 is applied to a first input of AND gate 57 through a loop, the other input is connected to the output of NOR gate 58. The latter receives a RESET signal and the signal generated by AND gate 54. The signal outputs by latch 55 is complemented in inverter 59 to generate the overflow/underflow bit L mentioned above. The role of OD circuit 27 is to thus detect a transition in the selection. For instance, $G_5$ to $G_6$ implies L=1 indicating thereby there is an overflow and therefore the index must be changed from 5 to 6. Note that, in case of two bits per period, two OD circuits 27-1 and 27-2 would be then required, processing select signals $G_2$/$G_3$ and $G_8$/$G_9$ respectively.

Figure 11:
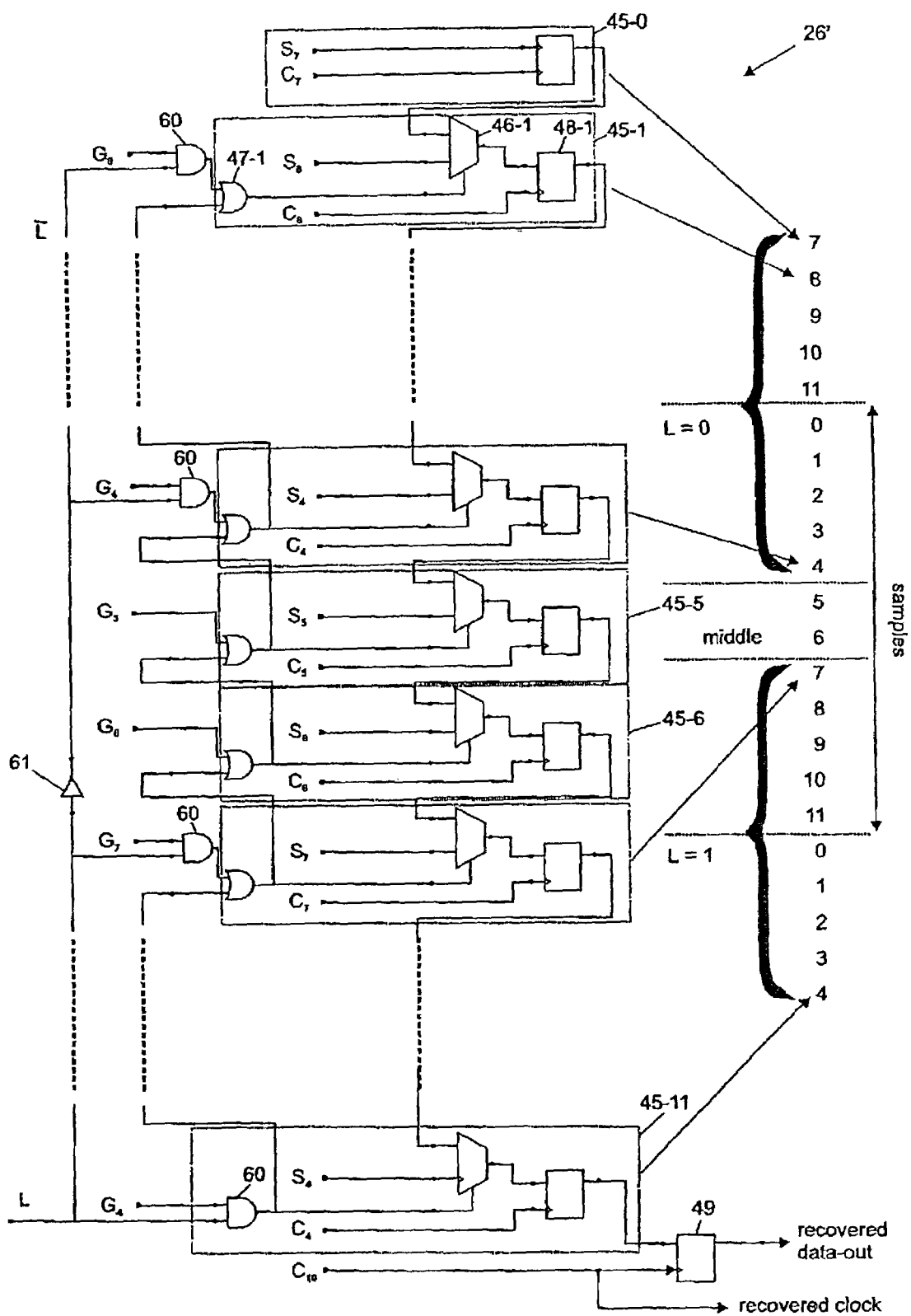
FIG. 11 shows the sample selection and data alignment circuit of FIG. 8 when it is adapted to work with the overflow/underflow detection circuit of FIG. 10.

FIG. 11 shows SSDA circuit 26 of FIG. 8, now referenced 26', after it has been modified to work with OD circuit 27. Now turning to FIG. 11, for each block 45, except blocks 45-5 and 45-6, the G signal is gated in an AND gate 60 either by signal L or by signal –L (complemented in inverter 61).

Table 1 shown in FIG. 12 indicates which sampled signal S is selected versus the combination of the G signal and the underflow/overflow bit L. It is important to notice that events outside the current period can be taken in consideration. During period T+1, the sampled signal $S_0$ that was obtained at period T could now be used in lieu of signal $S_0$ generated at period T+1.

If, now SSDA circuits 26-1 and 26-2 are used instead (to be combined with circuits 27-1 and 27-2), the following Tables 2 and 3 apply.

TABLE 2

| $G_4$ | $G_5$ | $G_0$ | $G_1$ | $G_2$ | $G_3$ | $G_4$ | $G_5$ | $G_0$ | $G_1$ |
|---|---|---|---|---|---|---|---|---|---|
| 0 | 0 | 0 | 0 | X | X | 1 | 1 | 1 | 1 |
| $S_{10}$ | $S_{11}$ | $S_0$ | $S_1$ | $S_2$ | $S_3$ | $S_4$ | $S_5$ | $S_6$ | $S_7$ |

X = don't care

Table 3 shows the situation for the second bit. In this case, signals $G_8$ and $G_9$ are used as inputs instead of $G_2$ and $G_3$.

TABLE 3

| $G_{10}$ | $G_{11}$ | $G_6$ | $G_7$ | $G_8$ | $G_9$ | $G_{10}$ | $G_{11}$ | $G_6$ | $G_7$ |
|---|---|---|---|---|---|---|---|---|---|
| 0 | 0 | 0 | 0 | X | X | 1 | 1 | 1 | 1 |
| $S_4$ | $S_5$ | $S_6$ | $S_7$ | $S_8$ | $S_9$ | $S_{10}$ | $S_{11}$ | $S_0$ | $S_1$ |

As a result, at the cost of implementing an OS circuit 24 that is relatively simple, which delivers a few sampled signals S (in this case 12), DR block 23 is able to reliably discriminate data within a 70 ps width window with a clock having a period equal to T=800 ps. Extensive simulations have demonstrated that the DR block 23 is very tolerant to data jitter with an amplitude of up to 1.5 times the clock period of the incoming data. DR block 23 is insensitive to phase error between the recovered clock and any recovered data.

The term "coupled" used in the specification and in the claims includes various types of connections, either direct or through one or more intermediate components.

It will be apparent to those skilled in the art that various modifications may be made in the circuit illustratively described therein, without departing from the spirit or scope of the invention as expressed in the following claims.

What is claimed is:

1. A sample selection and data alignment circuit for selecting a selected over sampled signal among a plurality of over sampled signals ($S_0$, . . . , $S_{n-1}$) obtained by over sampling an incoming serial data stream of bits at n clock phase signals ($C_0$, . . . , $C_{n-1}$) of a multiphase clock signal, according to a corresponding select signal, and synchronously aligning said selected over sampled signal relative to a predefined phase of said multiphase clock signal to produce a recovered data, the circuit comprising:
   n logic blocks, connected serially, each block comprising:
      a first logic block labeled 0;
      a plurality of n–2 intermediate logic blocks labeled 1 to (n–2); and
      a last logic block labeled (n–1); and
   an output latch coupled to said last logic block, said output latch having an output latch data input, an output latch clock input and an output latch data out,
   wherein said first logic block 0 includes a level sensitive latch 0 receiving over sampled signal $S_0$ on its data input 0 and the phase clock signal $C_0$ on its clock input 0,
   wherein said last logic block n–1 includes a multiplexer n–1 and a level sensitive latch n–1 that are serially connected, said multiplexer n−1 having a first and second multiplexer input n−1 and a multiplexer output n−1, said level sensitive latch n−1 having a latch data input n−1, a latch clock input n−1 and a latch output n−1, wherein the first multiplexer input n−1 is connected to the level sensitive output n−2 of the level sensitive latch of the preceding logic block and the second multiplexer input n−1 receives sampled signal $S_{n-1}$, and the multiplexer n−1 is controlled by select signal $G_{n-1}$; the multiplexer output n−1 is connected to the latch data input n−1, that latch clock input n−1 receives clock phase $G_{n-1}$; the latch output n−1 connected to the output latch data input, and wherein each of said intermediate logic blocks having label i, includes a multiplexer i and a level sensitive latch i that are serially connected, said multiplexer i having a first and second multiplexer input i, and said level sensitive latch i having a latch data input i, a latch clock input i and a latch output i, wherein the first multiplexer input i is connected to the level sensitive latch output i−1 of the level sensitive latch of the preceding logic block i−1 and wherein the second multiplexer input i receives over sampled signals $S_i$; said multiplexer i being controlled by a control signal i which is obtained by ORing select signal $G_i$ and the control signal i+1 of the next multiplexer i+1, the multiplexer output i being connected to the latch data input i and wherein the latch clock input i receives clock phase signal $C_i$.

2. The sample selection and data alignment circuit of claim 1, said output latch having an output latch data input, an output latch clock input and an output latch output, said output latch data input being connected to and providing a selected over sampled signal to the latch output n−1 and said output latch clock input being coupled to clock phase signal $C_{n/2}$ of the multiphase clock signal to store the selected over sampled signal as a recovered (retimed) data signal that is aligned with the predefined phase of said multiphase clock signal.

3. The sample selection and data alignment circuit of claim 1 wherein said output latch is either an edge triggered flip-flop or a level sensitive flip-flop.

* * * * *